June 8, 1965 F. H. RAYMOND ETAL 3,188,391

PRIVACY DEVICE FOR TELEPHONE SYSTEMS

Filed Sept. 27. 1961

Inventors:
Francois H. Raymond
Jean H. Lemoine
By Kemon, Palmer, Stewart and Estabrook, Attorneys United States Patent Office 3,188,391
Patented June 8, 1965

3,188,391
PRIVACY DEVICE FOR TELEPHONE SYSTEMS

François Henri Raymond, Saint-Germain-en-Laye, and Jean Henri Lemoine, Rueil-Malmaison, France, assignors to Societe d'Electronique et d'Automatisme, Courbevoie, Seine, France Filed Sept. 27, 1961, Ser. No. 141,107
Claims priority, application France, Oct. 10, 1960, 840,895, Patent 1,276,733
4 Claims. (Cl. 179—1.5)

The present invention concerns improvements in or relating to confidential telephony systems and has for its object an improved privacy device to be inserted between the handset and the switching circuits of a normal telephone subscriber's set in order to render unintelligible for any third party who may be branched off a telephone line the communications between the subscribers whose sets have been provided with such privacy devices.

A further object of the invention is to so provide such a privacy device that it does not have recourse to any frequency band transpositions and mixings which necessitated cumbersome and costly low frequency filters, but on the other hand to so provide said device that it may be of simple design and manufactured with small volume and low cost, though nevertheless it is of the same order of secrecy preservation as were such prior frequency band handling systems.

A device according to the invention is mainly based on the time slicing and transposing process of a communication and is mainly characterized in that it comprises the combination of means for temporarily recording parts of the communications, means for reading out such partial records according to a predetermined fractioning, means for temporarily re-recording said fractional parts of the first record with a transposition placed under the control of a time varying key and means for sequentially reading-out said re-recorded parts of the communication and routing them to a normal telephone line.

According to another feature of the invention, the temporary recording and re-recording means include a magnetic loop member driven under magnetic heads which comprise a plain language recording head, a plurality of read-out heads, an erasing head, a plurality of read-in heads, a jammed or scrambled language read-out head and a further erasing head, all arranged sequentially around the said loop, and read-out record transposing means connected between the read-out heads of said plurality and the read-in heads of said plurality.

According to a further feature of the invention, said transposing means comprise a plurality of cascaded-connected connection-switching inverter stages each comprising a plurality of inverter contacts at the input thereof under the control of a key signal and a pre-wired combinator or connection router to the outputs thereof.

According to a further feature of the invention, the connections between the key signal generator and the control members responsive to such signals for controlling the said inverter contacts are partly at least provided with manual adjustment means.

Figure 1:
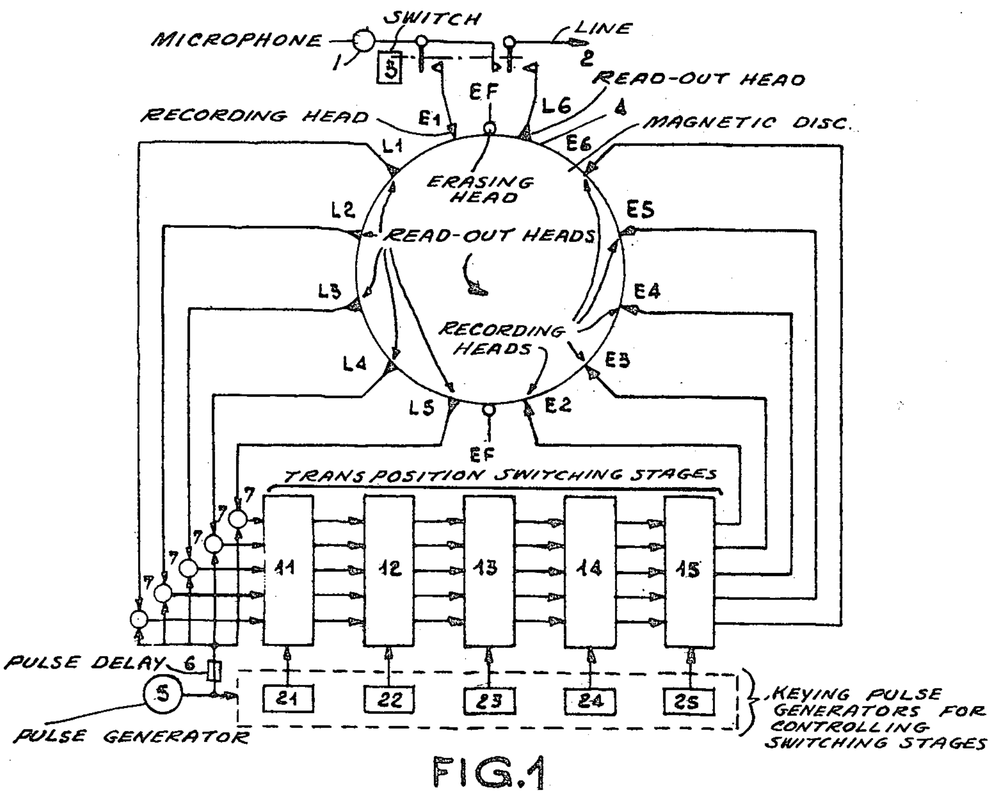
Figure 2:
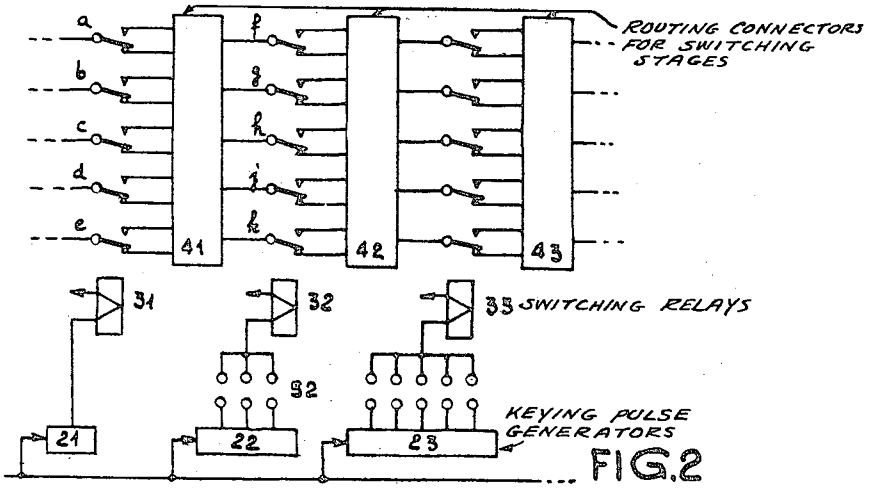

These and other features will be fully described with reference to an illustrative embodiment of the invention shown on the accompanying drawings, wherein:

FIG. 1 is an overall arrangement wherein the control part is shown in schematic blocks; and, FIG. 2 is a more detailed schematic arrangement of the control part in the device of FIG. 1.

The device according to the invention is connected between the microphone 1 of the telephone handset and the communication line 2 of the telephone set by means of a manually controlled switch 3 which, in one of its positions, connects the microphone 1 to the line 2 for a plain language communication and in its other position connects the microphone to the read-in head $E_1$ of the privacy device and the line 2 to the read-out head $L_6$ of said device for a jammed language communication, as the subscriber may wish. Read-in head $E_1$ and read-out head $L_6$ are arranged in operative relation with a magnetic loop recording member 4, for instance a magnetic disc which is permanently driven in rotation at a constant speed. Between $E_1$ and $L_6$ is an erasing head EF. In the direction of rotation of the disc 4, are associated to the disc a first plurality of magnetic heads, $L_1$ to $L_5$ at equidistant angular spans, then an erasing head EF and a second plurality of magnetic heads $E_2$ to $E_6$ of equally equidistant spans. The number of the heads in said pluralities is merely illustrative. The heads L are read-out heads, the heads E are read-in heads. All the heads are permanently activated for the operation of the device.

The read-out heads $L_1$ to $L_5$ are connected through as many gates 7 to the inputs of a transposition arrangement comprising for instance five stages, 11 to 15, each stage being controlled from a digit of a jamming control key. Said key comprises five members 21 to 25. The outputs of the transposition arrangement are connected to the read-in heads $E_2$ to $E_6$. The activation of the key digit generators 21 to 25 is timed from a pulse generator 5. Each digit generator being made of a pulse counter, the pulse generator 5 will merely consist of a timing pulse generator of a conventional design in digital computers. Any pulse from 5 is further delayed at 6 for controlling the gates 7 which will enable the vocal frequency signals read-out by the heads $L_1$ to $L_6$ to be applied to the corresponding inputs of the transposition arrangement, during a time interval equal to the time the magnetic disc 4 needs for rotating by the angular span between two successive heads associated therewith. The delay 6 is made equal to the time interval useful for the change of condition of the key under the activation of the control pulse. The speed of rotation of the disc 4 is, for instance, equal to one rotation per second. By a suitable adjustment of the timing, with respect to such speed of rotation, the jammed transmission is uninterrupted on line 2. Each fraction of the communication lasting for instance one tenth of a second, the overall delay between the microphone 1 and the line 2 will be at most of the order of one-half of a second.

Each transposition or switching stage may comprise for instance a relay, 31, 32, 33 . . . and a connection distributor, 41, 42, 43 . . . , FIG. 2, wherein are shown the three first stages of the transposition arrangement and the corresponding key members. Each key member is as said a pulse counter and the periods of said counters, which are of the loop count kind, are provided distinct from one counter to the other one and, preferably, said maximum counts are so chosen as to be prime numbers with respect to each other. For instance the counter 21 may be provided with a maximum count of 2, the counter 22 with a maximum count of 3, the counter 23 with a maximum count of 5, the counter 24 with a maximum count of 7 and the counter 25 with a maximum count of 11. Counter 21 will then be made of a mere binary stage of a condition reverted at each timing pulse from 5 and consequently inverting each time a pulse is received from 5 the condition of relay 31, and consequently the condition of the five change-over contacts of said relay. The armatures of the change-over contacts of the first switching stage are connected to the outputs of the read-out heads $L_1$ to $L_5$. The pairs of contacts of said change-over contacts are, within 41, distributed to five outputs only and said outputs are directly connected to the armatures of the change-over contacts of the next following stage of the transposition arrangement, and so forth from stage to stage. The connector or router 41 is such that, for one condition of the relay 31, the armatures *a, b, c, d, e* are, through the contacts corresponding to said condition, and through the connector arrangement of 41, connected to the five outputs according to a predetermined distribution and, for the other condition of the relay 31, according to another predetermined distribution. Actually, the action of such a connection routing member as 41 is to permutate the connections between inputs and outputs thereof so that according to the condition of the relay 31, *a, b, c, d, e*, are connected to a predetermined combination of *f, g, h, j, k*, or another predetermined combination of *f, g, h, j, k*. Each member 41, 42, 43 . . . then constitute a permanent internal router key in the device. Said key may be modified by replacement of the members or, if required, by providing them as combinators of connections. However, attention must be brought to the fact that combinations may be self-destructive in the complete cascade so that it seems preferable to have them fixed once for all and not left at the disposal of the users unless a suitable chart of combinations is supplied to them.

The outer jamming key constituted by the counters may generate a large number of distinct keys since, for instance with the five counters made as said above, the key generator may produce $2^{26}$ distinct keys: not considering the first counter 21, there remain 3+5+7+11 binary positions in the other five counters which may be brought to the disposal of the users for any choice of the key to use with any remote correspondent subscriber's set which disposes of the same device (the arrangement automatically unjams jammed received signals). For instance, as shown in FIG. 2, the counter 22 may be made of three separate binary positions each available by a separate output to the control wire of the relay 32 and a connector 52 may be adjusted by the user for his own choice of the count in said stage of the key; in the counter stage 23, five outputs may be made available and the user may select any one of them and so forth for the remaining stages. Of course, the user may close several contacts of the connectors such as 52 if he so elects to do. The only conditions to be avoided are those where for all contacts are either closed or open in such connectors.

It may be noted that in each stage of the transposition cascade, four relay change-over contacts instead of five may be only provided if required, the fifth input lead being permanently connected to a definite output lead of the stage.

The operation of such privacy devices in a telephone exchange may be as follows: a number of telephone subscriber's sets are provided with such a device and to each of such sets is attributed a special key (all have identical permutators 41, 42 . . . ). When one subscriber wishes to speak to another one, he first calls said subscriber in plain language, after adjusting the connectors such as 52 in order to register with the key allotted to said other subscriber. Then he switches on jammed operation, contact 3. Once the communication is over, the calling subscriber resets the connectors 52 of his device to the conditions defined by the key which is allotted to him so that any other subscriber may call him at said other subscriber's request. As an alternative, no key may be set on a privacy device during the intervals between the calls, and the key may be set by both subscribers after they have established the connection in plain language.

What is claimed is:

1. In a device for securing privacy in telephone communications wherein the communication is recorded on one portion of a moving record carrier, and the recorded communication is picked up by a plurality of read-out heads spaced apart along one section of the path of travel of the record carrier, and the separate parts of the communication picked up by the different read-out heads are transposed in time sequence and re-recorded by a like plurality of recording or read-in heads arranged in spaced relation along another portion of the path of travel of said record carrier, an improved switching system for transposing the fractional parts of the communication picked up by the different read-out heads and supplying the fractional parts to different ones of the read-in heads in a predetermined time sequence which may be varied, said switching system comprising a plurality of switching stages arranged in cascade, each stage comprising a control relay having an operating winding and one switch tongue for each read-out head, said tongues being operated from one position to another upon energizing the relay winding, each switching stage further including output connections equal in number to the number of read-out heads and connected to the relay tongues of the next succeeding switching stage, a pair of contacts for each tongue element arranged to be engaged by the tongue in said two positions, said pair of contacts being connected to the output connections of its stage to effect connections from the tongues of each stage to the output connections of the same stage according to one pattern when the tongues are in one position, and according to another pattern when the tongues are in the other position, the tongues of the first switching stage being connected to be energized from the read-out heads respectively, and the output connections for the last switching stage being connected to energize the read-in heads for re-recording the fragmentary parts of the communication in a different time sequence determined by the positions of the tongue elements in the various switching stages.

2. A device according to claim 1 and including a pulse counter for each control relay, a timing pulse generator for energizing said pulse counters, and an output circuit from each counter to the corresponding control relay.

3. A device according to claim 2, wherein the maximal counts of said counters are taken in relative prime numbers.

4. A device according to claim 3, wherein each counter is provided with a plurality of outputs for the actuation of the corresponding control relay and means are provided for selecting one or more of said outputs for the actual actuation of said relay.

References Cited by the Examiner

UNITED STATES PATENTS

| | | | |
|---|---|---|---|
| 2,265,044 | 12/41 | Osborne | 179—1.5 |
| 2,401,888 | 6/46 | Smith | 179—1.5 |

ROBERT H. ROSE, *Primary Examiner.*